G. H. F. HOLY.
RESILIENT DRIVING CONNECTION.
APPLICATION FILED NOV. 6, 1915.
1,280,033.
Patented Sept. 24, 1918.
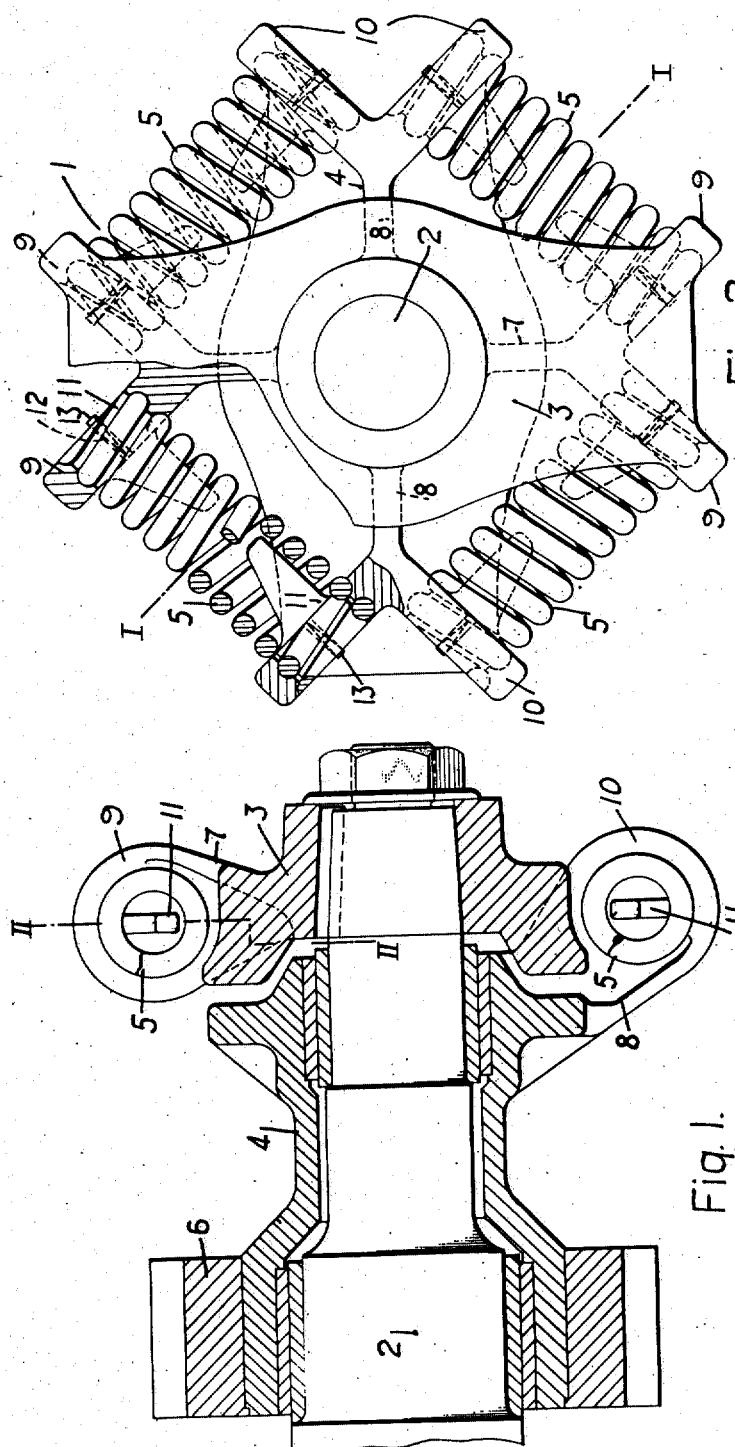
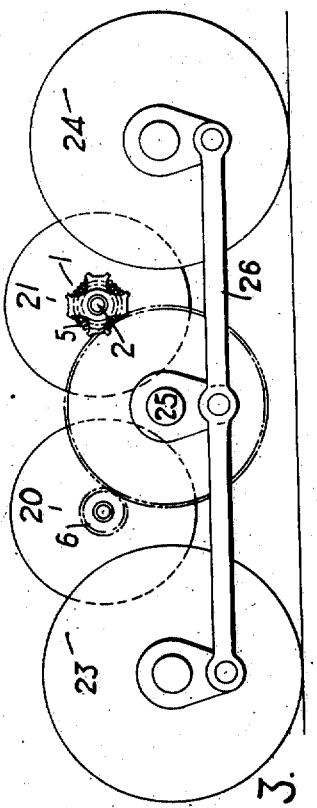
WITNESSES:
INVENTOR
George H. F. Holy.
BY
ATTORNEY

UNITED STATES PATENT OFFICE.

GEORGE H. F. HOLY, OF PITTSBURGH, PENNSYLVANIA, ASSIGNOR TO WESTINGHOUSE ELECTRIC AND MANUFACTURING COMPANY, A CORPORATION OF PENNSYLVANIA.

RESILIENT DRIVING CONNECTION.

1,280,033.  Specification of Letters Patent.  Patented Sept. 24, 1918.

Application filed November 6, 1915. Serial No. 60,080.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Resilient Driving Connections, of which the following is a specification.

My invention relates to means for resiliently and operatively connecting two members and it has special reference to such means as are interposed between the driving wheels of railway vehicles and the rotatable members of the propelling units.

The object of my invention is to provide a structure of the above specified character that shall be relatively compact, simple to construct, and easy to assemble, and that shall be reliable in operation.

Heretofore, structures of the class under consideration have not always been readily applicable to vehicles because of the limited available space for assembling such connections.

My invention provides a connection that is relatively compact and may be easily assembled where but little working space is available, as hereinafter more fully set forth.

Figure 1 of the accompanying drawing is a sectional view of a resilient connection embodying my invention as applied to a shaft of a railway vehicle-propelling motor, the section being taken along the line I—I of Fig. 2; Fig. 2 is a view, partially in side elevation and partially in section on line II—II of Fig. 1, with parts broken away; and Fig. 3 is a view, in side elevation, of an electric locomotive truck having a resilient connection embodying my invention.

Referring to Fig. 1 and Fig. 2 of the drawing, the resilient connection 1, as here shown, comprises a shaft 2 that is rigidly connected to the driving member 3, a driven member 4 that is rotatively mounted on the shaft 2 and is resiliently connected to the driving member 3 by means of a plurality of tangentially disposed springs 5, and a suitable pinion 6 that is secured to the driven member 4.

Referring especially to Fig. 2 of the drawing, the driving member 3 and the driven member 4 are respectively provided with a plurality of projecting arms 7 and 8. The above-mentioned arms are severally provided with a plurality of retaining rings 9 and 10 that are integral therewith and that serve as retaining means for the respective ends of the springs 5. The rings 9 and 10 are internally screw-threaded to receive convolutions of the springs 5. The internal diameter of the rings 9 is slightly smaller than that of the rings 10, for reasons to be hereinafter set forth.

Each spring 5 is interposed between a retaining ring 9, to which one end is secured by a suitable plug 11, and a retaining ring 10 to which the other end is secured by a similar means.

Each spring 5 is of the same pitch throughout its length and has a slight but uniform taper toward one end.

The cylindrical spring-retaining plug 11, the outer surface of which is screw-threaded to engage convolutions of the spring 5, is provided with a slot 12 into which wedges 13 may be forced.

To assemble such a connection as I have herein described, the smaller end of one of the springs 5 is inserted into one of the retaining rings 10, in the same manner as an ordinary taper-threaded bolt would be, and is screwed into place until the forward or smaller end of the spring engages one of the retaining members 9 and the rearward or larger end thereof engages the retaining member 10. It will readily be seen that, after the spring has been positioned, the ends thereof will fit tightly into place by reason of the before-mentioned taper of the springs and the differences in the internal diameters of the retaining rings 9 and 10. The ends of the spring are rigidly clamped into the retaining rings 9 and 10 by inserting the plugs 11 and forcing the wedges 13 into place.

It will thus be noted that the assembly of a construction such as I have described, may be effected in a relatively easy and simple manner and that this is especially true where the available working space is small.

A plurality of springs are, of course, employed for each connection, but, inasmuch as the remaining springs are similarly and symmetrically arranged with reference to the spring just described, I deem it unnecessary to describe the insertion of the remaining springs.

In Fig. 3 is shown a resilient connection, of the hereinbefore-specified type, embodied in a locomotive truck that comprises a plurality of propelling motors 20 and 21 which are adapted to drive a plurality of wheels 23 and 24 by means of a suitable jack-shaft 25 and a connecting rod 26.

When power is applied to rotate the shaft 2 in either direction, the driving member 3 will tend to move independently of the driven member 4, by reason of the compression of the springs 5. This independent movement of the driving member will continue until the springs have been sufficiently compressed to resist further relative movement, whereupon the driven member will be rotatively actuated. The compression of the springs will thus tend to cushion any shocks or jolts due to a sudden change in the angular velocity of the power transmission parts, as will be understood.

I do not wish to be restricted to the specific structural details or location of parts herein set forth, as various modifications thereof may be effected without departing from the spirit and scope of my invention. I desire, therefore, that only such limitations shall be imposed as are indicated in the appended claims.

I claim as my invention:

1. A resilient connection comprising a driving member, a driven member, a plurality of helical springs for resiliently connecting said members, and means whereby said springs may be screwed axially into operative relation with said members.

2. A resilient connection comprising a driving member having an integral spring-retaining means, a driven member having an integral spring-retaining means, and a plurality of helical springs for resiliently connecting said members, each of said retaining means being internally screw-threaded to receive convolutions of said springs.

3. A resilient connection comprising a driving member having spring-retaining recesses, a driven member having similar spring-retaining recesses, and a plurality of helical springs for resiliently connecting said members, said recesses being of different diameters and internally screw-threaded to receive convolutions of said springs.

4. A resilient connection comprising a driving member having spring-retaining recesses, a driven member having spring-retaining recesses, a plurality of helical springs for resiliently connecting said members, said retaining recesses being internally screw-threaded to receive end convolutions of said springs and plugs within said end convolutions and spring-retaining recesses.

5. A resilient connection comprising a driving member having a plurality of spring-retaining recesses, a driven member having corresponding recesses therein, and a plurality of frusto-conical helical springs for resiliently connecting said members, said recesses being of different diameters and internally screw-threaded to receive convolutions of said springs.

6. A resilient connection comprising a driving member having spring-retaining recesses, a driven member having like recesses, and a plurality of helical springs for resiliently connecting said members, said recesses being internally screw-threaded to receive convolutions of said springs and said recesses being of different diameters and adapted to closely fit said springs when in position.

7. A driving connection comprising a driving member having radial projections, a driven member having like projections, each of said projections having a spring-receiving recess, and a plurality of tangentially-arranged frusto-conical helical springs interposed between said projections on said driving and driven members, the ends of said springs being secured in said recesses.

8. A driving connection comprising two relatively rotatably mounted members, and a frusto-conical helical spring having one end rigidly secured to one of said members and having the other end rigidly secured to the other of said members.

9. A resilient connection comprising a driving member and a driven member, said driving member comprising a plurality of radially extending arms each having a spring-receiving recess in the end thereof, said driving member being adapted to be secured to a shaft, said driven member comprising a plurality of radially extending arms having like recesses in the ends thereof, and a sleeve portion adapted to be rotatably mounted upon said shaft, a pinion secured to said sleeve, the recesses of one of said members being larger than the recesses of the other of said members, and a frusto-conical spring for resiliently connecting said members, each end of said spring being respectively secured in one of said recesses.

In testimony whereof, I have hereunto subscribed my name this 26th day of Oct., 1915.

GEORGE H. F. HOLY.